(12) United States Patent
Tan et al.

(10) Patent No.: US 7,491,927 B2
(45) Date of Patent: Feb. 17, 2009

(54) COLOR SENSING CIRCUIT EMPLOYING CHARGE STORAGE DEVICE

(75) Inventors: Boon Keat Tan, Penong (MY); Chi Mun Ho, Taman Bunga Blossom (MY); Len Li Kevin Lim, Perok (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 956 days.

(21) Appl. No.: 10/877,864

(22) Filed: Jun. 24, 2004

(65) Prior Publication Data
US 2005/0285017 A1   Dec. 29, 2005

(51) Int. Cl.
*G01J 3/50* (2006.01)

(52) U.S. Cl. .................. 250/226; 250/214 R; 356/402; 356/425

(58) Field of Classification Search .............. 250/208.1, 250/214 R, 226; 348/272
See application file for complete search history.

(56) References Cited

U.S. PATENT DOCUMENTS

| | | | | |
|---|---|---|---|---|
| 5,900,623 A | * | 5/1999 | Tsang et al. | 250/208.1 |
| 6,025,589 A | * | 2/2000 | Aswell et al. | 250/226 |
| 6,246,043 B1 | * | 6/2001 | Merrill | 250/208.1 |
| 6,274,879 B1 | * | 8/2001 | Best-Timmann | 250/573 |
| 6,518,558 B1 | * | 2/2003 | Bohm et al. | 250/208.1 |
| 6,833,549 B2 | * | 12/2004 | Numai et al. | 250/370.14 |
| 6,950,136 B1 | * | 9/2005 | Hagihara et al. | 348/302 |

OTHER PUBLICATIONS

Lin, Wen. C., Handbook of Digital System Design, 2nd Edition (1990).*

* cited by examiner

*Primary Examiner*—Stephen Yam

(57) ABSTRACT

The color sensing circuit includes a light detector to receive light and to generate a signal that is dependent on the received light. The light detector includes a first electrode coupled to a first node and a second electrode coupled to a second predetermined signal. A storage device is provided that includes a first node and a second node coupled to the second predetermined signal. A first switch is provided that selectively couples the first node with the first electrode of the storage device based on a charge control signal. A signal processing circuit is provided that includes a first electrode and an output to generate an output signal that represents the light received by the light detector. A second switch is also provided that selectively couples the first electrode of the storage device with the first electrode of the signal processing circuit based on an evaluate control signal. The signal processing circuit selectively asserts the charge control signal and evaluate control signal.

20 Claims, 5 Drawing Sheets

COLOR SENSING CIRCUIT EMPLOYING CHARGE STORAGE DEVICE

BACKGROUND OF THE INVENTION

Color sensors are becoming more prevalent and have many potential areas of use and application. These applications include office automation, quality control and color coding in such industries as food, textile, paint, assembly and packaging, environmental lighting, consumer good, pharmaceutical, medical and research and automotive.

FIG. 5 illustrates a prior art color sensor 2 implemented on a printed circuit board 10. The prior art color sensor 2 includes a photodiode 4, a transimpedance amplifier 6, and external components (e.g., resistors) 8 that are mounted on a printed circuit board (PCB) 10. The photodiode 4 converts color light into a corresponding current that represents the incident light. The operational amplifier 6 functions as a transimpedance amplifier and generates an output voltage (V_OUT) that represents the light received by the photodiode 4. The external components 8, which can be feedback resistors, for example, may be tuned to achieve a proper gain for the amplifier 6.

FIG. 6 illustrates a prior art circuit implementation of a color sensor 2 of FIG. 5. The photodiode 4 can includes a filter and a photodiode. The filter and photodiode are referred to as a color sensor. The transimpedance amplifier includes a negative input terminal, a positive input terminal, and an output for generating the output voltage (V_OUT). The negative input terminal is coupled to one terminal of the photodiode, and the positive input terminal is coupled to a second terminal of the photodiode, which is coupled to a ground potential. The negative input terminal and the output terminal of the amplifier are coupled through a feedback resistor (R_F) and a feedback capacitor (C_F). In other words, the feedback resistor (R_F) and the feedback capacitor (C_F) are coupled in parallel between the negative input terminal and the output terminal of the transimpedance amplifier.

Since this prior art approach employs external components (e.g., the external resistors), higher photocurrents are needed to make the color sensor less sensitive to noise, which is a major consideration when designing color sensors with external components. In order to provide higher photocurrents, a larger photodiode area is required. Moreover, large external feedback resistors 8 are needed for the transimpedance amplifier 6 to converts these large currents into a corresponding output voltage. Consequently, one disadvantage of the prior art color sensor is that the sensor wastes space. For example, the large photodiode area and large resistors utilized by the prior art design is very space inefficient.

Moreover, another disadvantage of the prior art color sensor is that the sensor design employs large external resistors, whose operating characteristics are very dependent on temperature. When the operating temperature changes, the operating characteristics of the temperature dependent devices also changes, thereby complicating the circuit design and injecting problems of how to maintain a consistent output across temperature variations.

Based on the foregoing, there remains a need for a color sensing circuit that overcomes the disadvantages set forth previously.

SUMMARY OF THE INVENTION

According to one embodiment of the present invention, the color sensing circuit includes a light detector to receive light and to generate a signal that is dependent on the received light. The light detector includes a first electrode coupled to a first node and a second electrode coupled to a second predetermined signal. A storage device is provided that includes a first node and a second node coupled to the second predetermined signal. A first switch is provided that selectively couples the first node with the first electrode of the storage device based on a charge control signal. A signal processing circuit is provided that includes a first electrode and an output to generate an output signal that represents the light received by the light detector. A second switch is also provided that selectively couples the first electrode of the storage device with the first electrode of the signal processing circuit based on an evaluate control signal. The signal processing circuit selectively asserts the charge control signal and evaluate control signal.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A color sensing circuit employing charge storage device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Color Sensing Circuit 100

Figure 1:
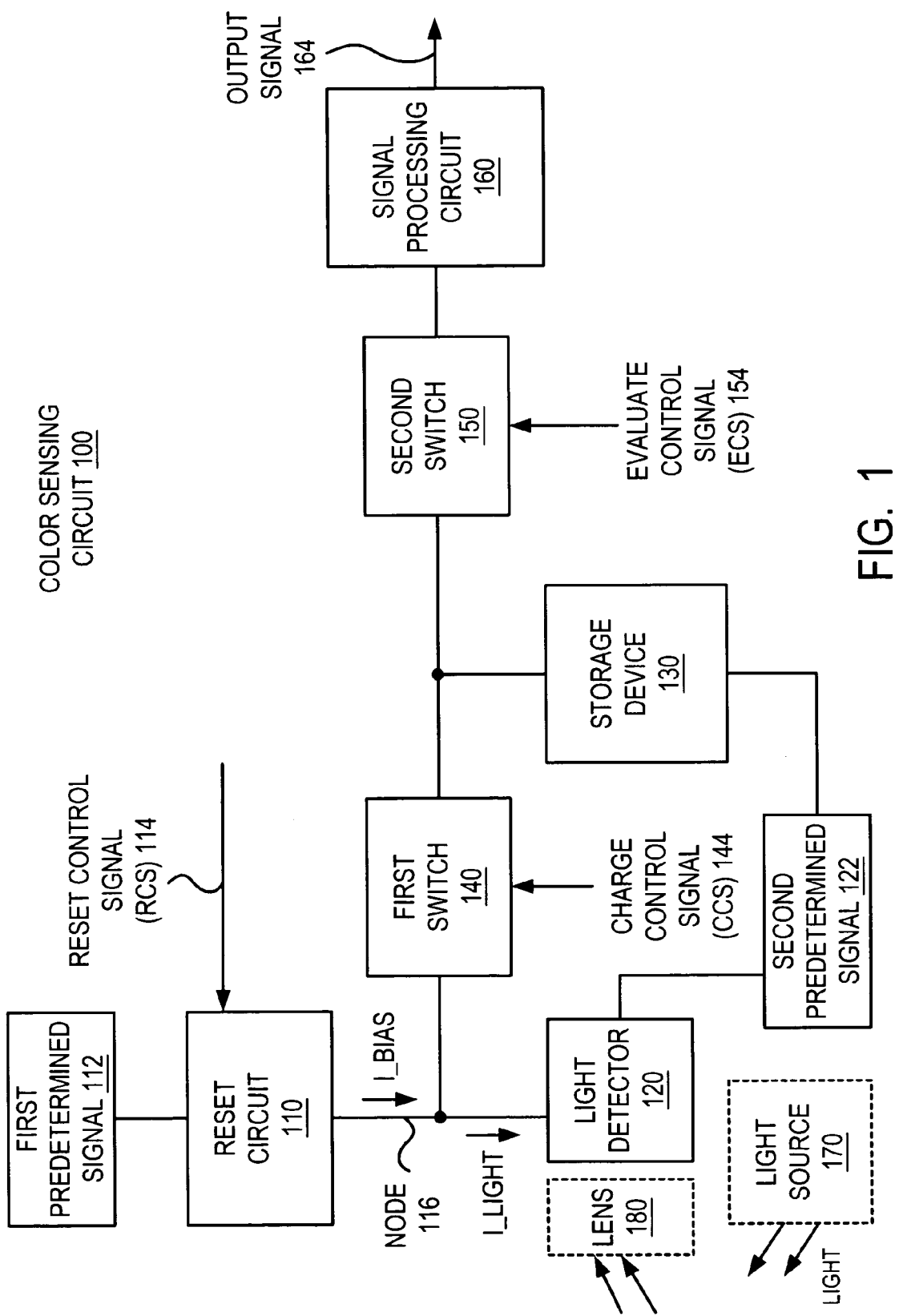
FIG. 1 illustrates a block diagram of the color sensing circuit according to one embodiment of the invention.

FIG. 1 illustrates a block diagram of the color sensing circuit 100 according to one embodiment of the invention. The color sensing circuit 100 converts the primary colors red, green and blue to individual, proportional analog voltages. In one embodiment, the color sensing circuit 100 combines photodiode arrays and associated amplifiers in a single package provided with a cable and a connector for power input and red (R), green (G) and blue (B) output voltages.

The color sensing circuit 100 includes a reset circuit 110, a light detector 120, a storage device 130, a first switch 140, a second switch 150, and a signal processing circuit 160. An exemplary circuit diagram for the color sensing circuit 100 is described in greater detail hereinafter with reference to FIG. 2.

The reset circuit 110 includes a first electrode coupled to a first predetermined signal 112 (e.g., a first predetermined voltage, $V_{DD}$) and a second electrode coupled to a first node 116. The reset circuit 110 receives a reset control signal 114. When the reset control signal 114 is asserted, the first node 116 is set to the first predetermined signal 112. In one embodiment, the first predetermined signal 112 is a predetermined voltage signal, and the reset circuit 110 selectively resets the first node 116 to a predetermined voltage (e.g., 2.5V).

The light detector 120 receives light (e.g., incident light) and generates a signal (e.g., a current, I_light) that represents the received light. In one embodiment, the light detector 120 is equipped with color filters to sense light that has a predetermined wavelength or a predetermined range of wavelengths, thereby making the light detector 120 sensitive to variations in color. For example, the light detector 120 can detect color light (e.g., a red light, a green light, a blue light). The light detector 120 includes a first electrode that is coupled to the second electrode of the bias current generator 110 and a second electrode that is coupled to a second predetermined signal 122 (e.g., a predetermined voltage signal). In one embodiment, the second predetermined voltage signal 122 is a ground potential ($V_{GND}$)).

The storage device 130 includes a first electrode that can be selectively coupled to the first node 116 and a second electrode that is coupled to the second predetermined voltage 122 (e.g., $V_{GND}$). The storage device 130 temporarily stores a signal (e.g., charge, current, or other electrical signal) that represents the amount of light received by or incident upon the light detector 120.

The first switch 140 selectively couples the first node 116 (i.e., the second electrode of the bias current generator 110 and the first electrode of the light detector 120) with the first electrode of the storage device 130 based on a charge control signal (CCS) 144.

The signal processing circuit 160 includes a first electrode (e.g., an input node) that can be selectively coupled to the first electrode of the storage device 130 and an output. The signal processing circuit 160 generates an output signal 164 that represents the received by the light detector. For example, signal processing circuit 160 can include multiple output pins to generate signals that represent the light received by the light detector 120. In one embodiment, the output signal 164 includes a plurality of color light signals (e.g., an output color light signal for each color channel (R, G, B)). The signal processing circuit 160 can be implemented as a state machine. An exemplary state diagram for a state machine implementation of the signal processing circuit 160 is described in greater detail hereinafter with reference to FIG. 2.

The second switch 150 selectively couples the first electrode of the storage device 130 to the first electrode of the signal processing circuit 160 based on an evaluate control signal (ECS) 154. A timing diagram of the charge control signal 144 (CCS), evaluate control signal (ECS) 154, and reset control signal (RCS) 114 is described in greater detail hereinafter with reference to FIG. 4.

In one embodiment, a color sensor circuit according to the invention includes three color sensors (R, G, and B sensor) and is integrated onto a single integrated circuit (IC) or "chip."

Furthermore, it is noted that the color sensing circuit according to the invention can be implemented in transmissive color sensing applications and reflective color sensing applications.

In one embodiment the color sensor circuit is designed for transmissive applications, such as applications that are self-illuminated. In these applications, the color sensor circuit does not include a light source. Instead, the light sources can be ambient light, an incandescent bulb, a light-emitting diode (LED) or self-emissive displays.

In another embodiment, the color sensor circuit is designed for reflective applications. In this embodiment, the color sensor circuit according to the invention further includes a light source 170 and an optical lens 180 to focus reflected light onto the color sensor. This embodiment in which the color sensor circuit is packaged with a light source 170 and optical lens 180 is suitable for reflective applications in which light is reflected from a target surface or target object. The light source 170 can be, for example, a high intensity white light emitting diode (LED).

In one embodiment, the transmissive color sensor circuit is implemented as a single integrated circuit (IC) with a compact profile, and the circuit operates from a single 5V DC supply with a typical current consumption of about 20 mA or less. In another embodiment, the reflective color sensor circuit is implemented as a single integrated circuit (IC) with a compact profile, and the circuit operates from a single 5V DC supply and requires an additional current of approximately 25 mA to operate the LED light source. In these embodiments, the R, G and B outputs can be, but is not limited to, voltage signals in a predetermined range (e.g., from 0 to 3V).

Circuit Diagram of Color Sensing Circuit

Figure 2:
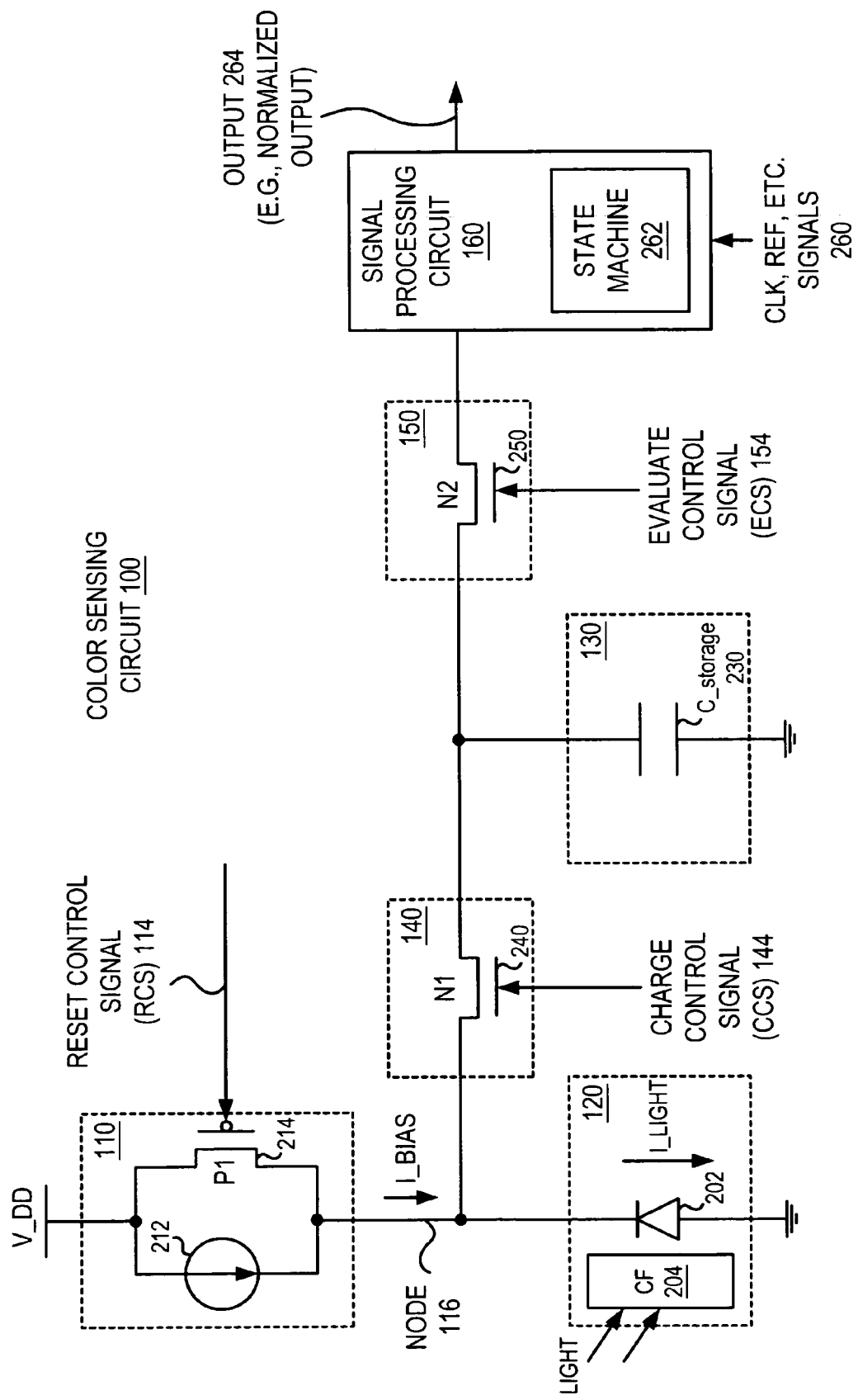
FIG. 2 illustrates a circuit diagram the color sensing circuit of FIG. 1 according to one embodiment of the invention.

FIG. 2 illustrates a circuit diagram the color sensing circuit 100 of FIG. 1 according to one embodiment of the invention. The light detector 120 can be a color sensor that is implemented with a photodiode 202 and a color filter 204. In one embodiment, the light detector 120 includes a color filter 204 for only allowing light with a certain wavelength to pass there through. The combination of the photodiode 202 and the filter 204 is also referred to herein as "filter-coupled photodiode" or "color sensor." In an alternative embodiment, the light detector 120 can be implemented with a phototransistor.

In one embodiment, the reset circuit 110 includes a bias current generator 212 for generating a bias current (I_bias) and a reset transistor (P1) 214. The bias current generator 212 can be implemented with a current source that generates a bias current. The current source includes a first electrode coupled to the first predetermined voltage and a second electrode coupled to the first node 116. The reset transistor includes a first electrode coupled to the first predetermined voltage, a second electrode coupled to the second electrode of the current source, and a third node for receiving the reset control signal (RCS) 114. The reset transistor selectively resets the voltage at the first node 116 to the first predetermined voltage when the reset control signal (RCS) 114 is asserted.

In one embodiment, the storage device 130 can be implemented with a charge storage device (e.g., a capacitor 230). It is noted that the storage device 130 can be implemented with other well-known electrical devices (e.g., an inductor, resistor, etc.) that store other types of electrical signals (e.g., current, voltage, etc.) or a combination thereof. The first switch 140 is implemented with a transistor (N1) 240. The transistor 240 includes a first electrode coupled to the first node 116, a second electrode coupled to the first electrode of the storage device 130, and a third electrode for receiving the charge control signal 144. The first electrode and the second electrode of the transistor form a current path, and current flows through the current path when the charge control signal 144 is asserted. The transistor 240 can be a MOS transistor.

The second switch 150 can also be implemented with a transistor (N2) 250. The transistor 250 includes a first electrode coupled to the first electrode of the charge storage device, a second electrode coupled to the first electrode of the signal processing circuit 160, and a third electrode for receiving the evaluate control signal 154. The first electrode and the second electrode of the transistor form a current path, and current flows through the current path when the evaluate control signal 154 is asserted. The transistor can be a MOS transistor. The signal processing circuit 160 includes a state machine 262 for selectively asserting the control signals 114, 144, 154. The signal processing circuit 160 can include inputs for receiving other signals 260 (e.g., clock signals, reference signals, etc.) that are known by those of ordinary skill in the art.

In one embodiment, the color sensing circuit according to the invention includes a color sensor front end that is followed by post-sensor circuitry. The color sensor includes a filter coated photodiode and converts the primary components of light, namely, Red (R), Green (G) and Blue (B), into photocurrent. The post-sensor circuitry converts photocurrent into analog voltages for each of the red, green, and blue (RGB) color components. These outputs may be denoted by VROUT, VGOUT and VBOUT, respectively. For example, output signal 264 can include three output signals, where there is one output signal for each color channel. It is noted that the components (e.g., 110, 130, 140, 150, 160) shown in FIG. 2 may be replicated for each color channel.

State Diagram of State Machine 262

Figure 3:
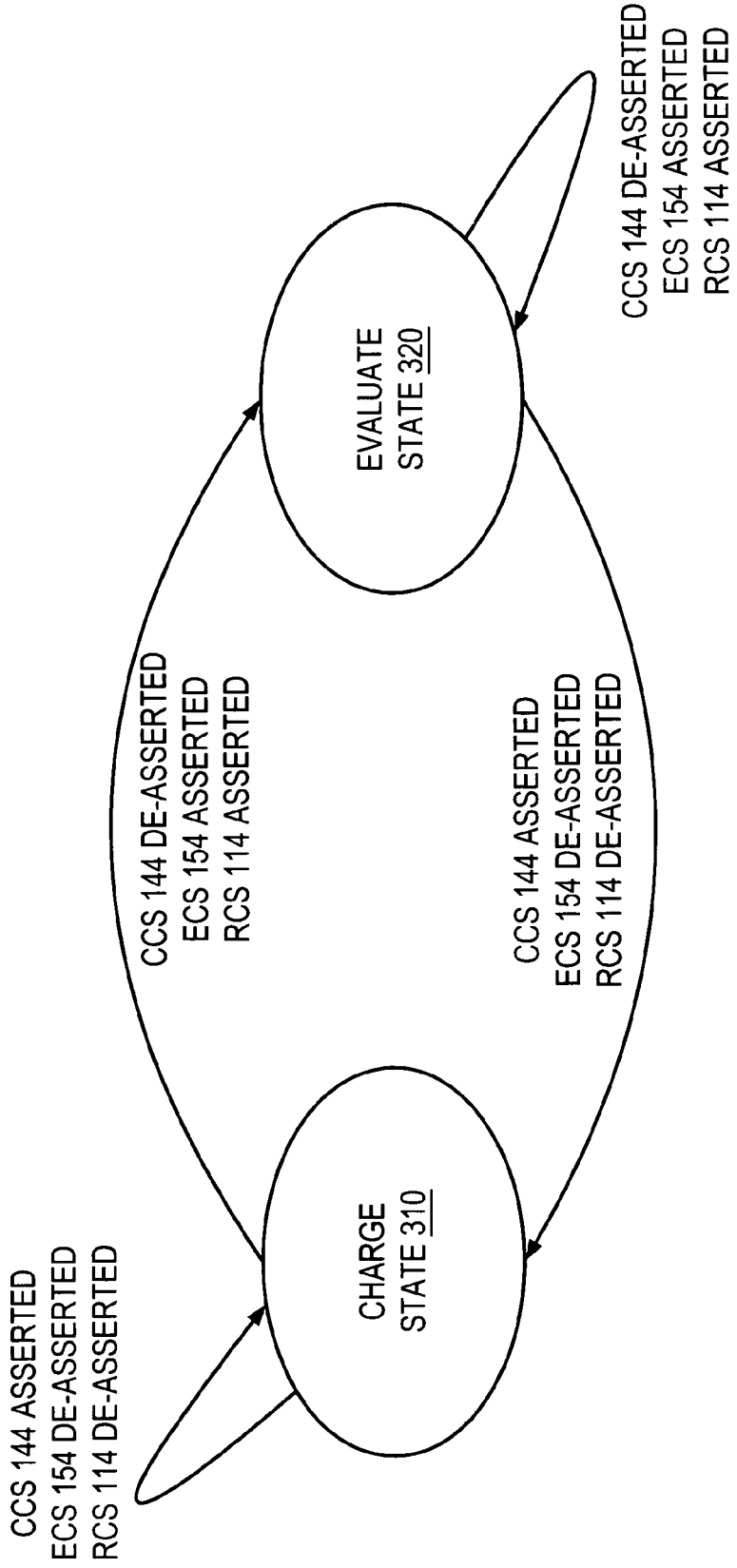
FIG. 3 illustrates a state diagram of the signal processing circuit of FIG. 1 according to one embodiment of the invention.

FIG. 3 illustrates a state diagram 300 of the signal processing circuit 160 of FIG. 1 according to one embodiment of the invention. The state diagram 300 of the state machine 262 includes a first state 310 and a second state 320. The first state 310 is hereinafter referred to as the CHARGE state 310. When in the CHARGE state 310, the signal processing circuit 160 asserts the charge control signal 144 and de-asserts the evaluate control signal 154. The reset control signal 114 is also de-asserted. During the CHARGE state 310, the net current (I_bias-I_light) is converted into charge and stored in the storage device 130. As noted previously, the first switch 140 is turned on in this state to allow charge to flow from the first node 116 to the storage device 130.

After a predetermined amount of time (e.g., 100 µs), the state diagram 300 of the signal processing circuit 160 transitions from the CHARGE state 310 to the second state 320. The second state 320 is hereinafter referred to herein as the EVALUTE state 320. When in the EVALUATE state 310, the signal processing circuit 160 asserts the evaluate control signal 154 and de-asserts the charge control signal 144. The reset control signal 114 is also de-asserted.

Timing Diagram

Figure 4:
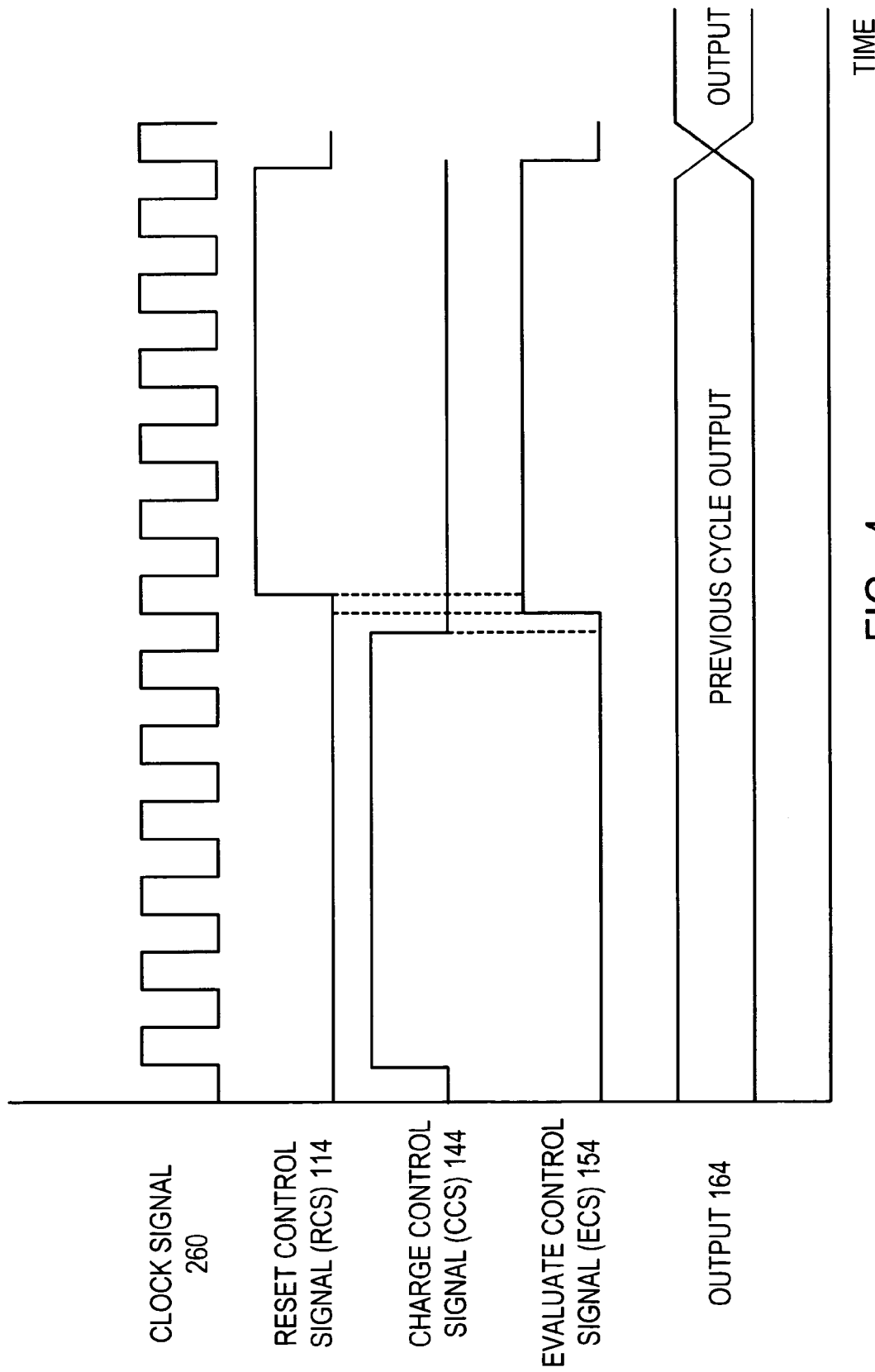
FIG. 4 is an exemplary timing diagram of control signals of FIG. 1 according to one embodiment of the invention.
Figure 5:
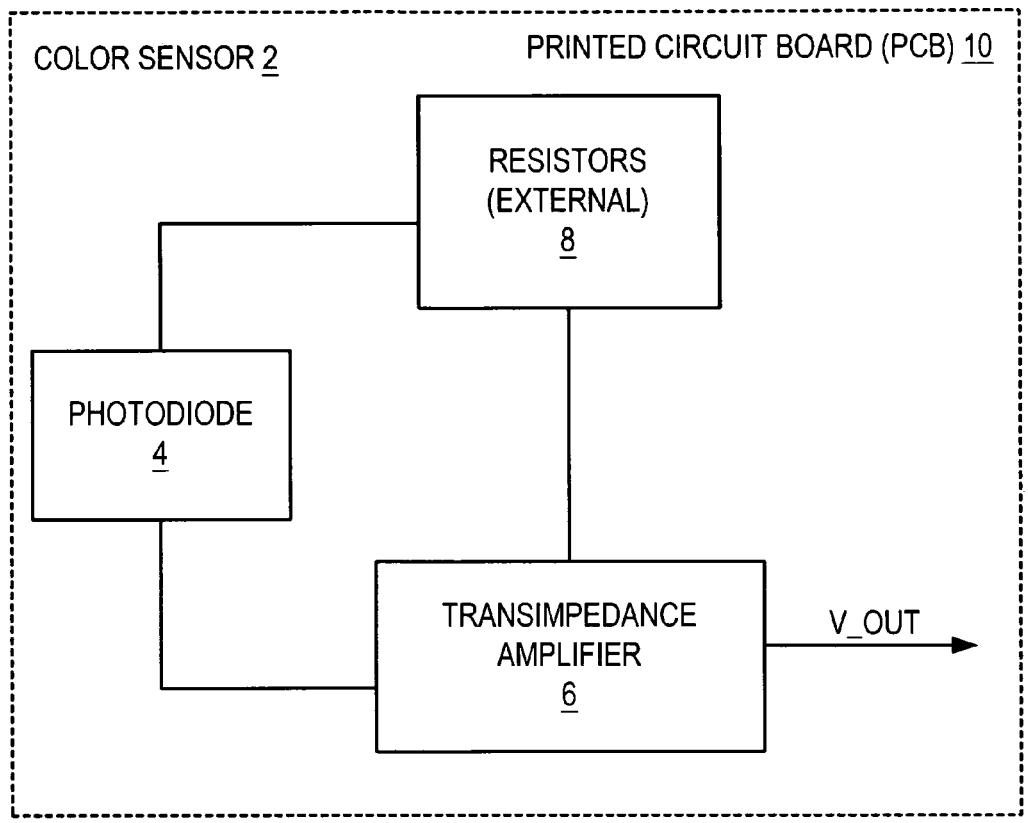
FIG. 5 illustrates a prior art color sensor implemented on a printed circuit board.
Figure 6:
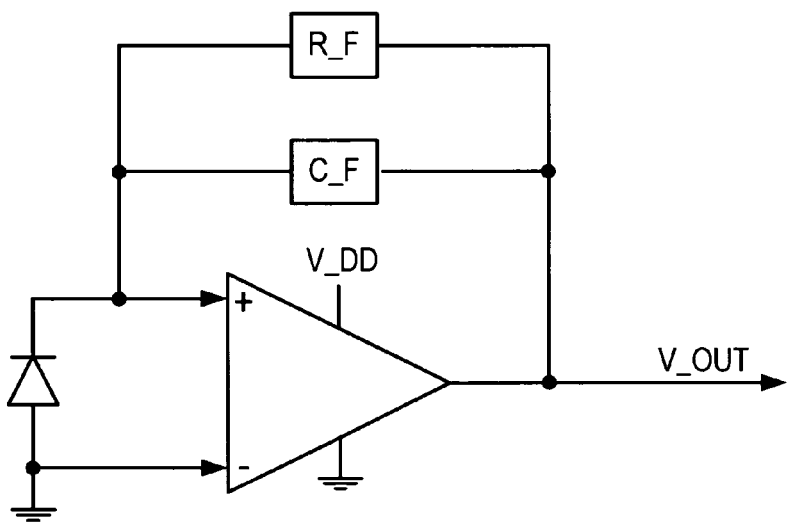
FIG. 6 illustrates a prior art circuit implementation of a color sensor of FIG. 5.

FIG. 4 is an exemplary timing diagram of control signals of FIG. 1 according to one embodiment of the invention. The timing diagram illustrates the charge control signal 144 and the evaluate control signal 154 and the reset control signal 114. It is noted that the charge control signal 144 and the evaluate control signal 154 are preferably non-overlapping. By not allowing the first switch 140 and the second switch 150 to be on at the same time, the signal processing circuit 160 reduces or avoids feedback or feed through along the charge-evaluation path.

The color sensing circuit according to the invention utilizes several switches (e.g., transistors), a color sensor device, and a storage device (e.g., a charge storage device). The color sensing circuit according to the invention does not need an operational amplifier, thereby avoiding the problems associated with the operational amplifier. For example, the color sensing circuit according to the invention does not have an offset problem that is caused by a saturated operational amplifier. Moreover, the color sensing circuit according to the invention does not require the external components (e.g., feedback resistors) used in amplifier-based designs, thereby removing one of the obstacles to integrating color sensor functions into a single integrated circuit.

Furthermore, the color sensing circuit according to the invention utilizes fewer temperature dependent devices, thereby avoiding the problems associated with the temperature dependent devices used by the prior art color sensor. For example, color sensing circuit according to the invention is more robust to temperature variations than the prior art color sensor since the color sensing circuit according to the invention does not employ the large feedback resistors used by the prior art sensor.

Furthermore, the color sensing circuit according to the invention is more space efficient (i.e., occupies a smaller die area) than prior art color sensors because the color sensing circuit according to the invention utilizes smaller photocurrents as compared to the currents employed by the prior art sensors.

Moreover, the color sensing circuit according to the invention provides a larger illuminance/irradiance range because the amount of charge accumulated is controlled by the CHARGE time and the EVALUATE time, which can be programmed or easily controlled by a digital circuit and switches. Furthermore, the color sensing circuit according to the invention provides a more sensitive color sensing scheme than the prior art sensor because the charge generated by the photocurrent is accumulated for a period of time before being amplified or evaluated.

The color sensing circuit according to the invention can be implemented in a wide variety of different applications for detecting color. This wide range of applications can include, for example, applications for controlling interior lighting and backlighting (e.g., liquid crystal display (LCD) back light), chemical analysis, color control of cosmetics and textiles, and in office automation for controlling the color output of printers and color calibration of image scanners.

Moreover, the color sensing circuit according to the invention can be used in imaging applications (e.g., ink detection), in medical/life science applications (e.g., a blood test), in camera applications (e.g., for camera calibration), and in backlight applications (e.g., a backlight control system). For example, the color sensing circuit according to the invention can be implemented in a display of a cellular telephone, a display of a portable computer, a display of a personal digital assistant (PDA), a computer monitor or display, and television display.

The color sensing circuit according to the invention can be utilized in applications that include, but are not limited to, color detection applications, color measurement applications, and color control applications. Color detection applications identify the presence or absence of a specific color. Color measurement applications identify a color based on its red, green and blue components. Color control applications use the color sensor as part of a closed-loop feedback system to produce and maintain a required color.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A color sensing circuit for one of identifying a color, measuring a color, and color control comprising:
   a) a light detector to receive light and to generate a signal that is dependent on received light; wherein the light detector includes a first electrode coupled to a first node and a second electrode coupled to a second predetermined signal;

b) a storage device that includes a first electrode and a second electrode; wherein the second electrode is coupled to the second predetermined signal;

c) a first switch to selectively couple the first node with the first electrode of the storage device based on a charge control signal;

d) a signal processing circuit that includes a first electrode, a first output that generates a first color signal, and a second output that generates a second color signal; and e) a second switch to selectively couple the first electrode of the storage device with the first electrode of the signal processing circuit based on an evaluate control signal; wherein the signal processing circuit selectively asserts the charge control signal and evaluate control signal.

2. The color sensing circuit of claim 1 wherein the charge storage device is implemented with a capacitor.

3. The color sensing circuit of claim 1 wherein the first switch further comprises:

a transistor that includes a first electrode coupled to the second node of the current source, a second electrode coupled to the first node of the charge storage device, and a third electrode for receiving the charge control signal; wherein the first electrode and the second electrode form a current path and wherein current flows through the current path when the charge control signal is asserted.

4. The color sensing circuit of claim 1 wherein the second switch further comprises:

a transistor that includes a first electrode coupled to the first node of the charge storage device, a second electrode coupled to the first node of the signal processing circuit, and a third electrode for receiving the evaluate control signal; wherein the first electrode and the second electrode form a current path, and wherein current flows through the current path when the evaluate control signal is asserted.

5. The color sensing circuit of claim 1 wherein the light detector includes a photodiode to receive light and to generate a photodiode current corresponding to the received light and a color filter to allow only light of a predetermined wavelength to pass there through.

6. The color sensing circuit of claim 1 wherein the signal processing circuit includes a state machine that includes a charge state and an evaluate state; wherein the charge control signal is asserted during the charge state, the evaluate control signal is asserted during the evaluate state, and the reset signal is asserted during the evaluate state.

7. The color sensing circuit of claim 1 wherein the color sensing circuit is implemented in one of a color detection application, color measurement application, a color control application, an application for controlling interior lighting, an application for controlling backlight, an imaging application, a medical/life science application, a camera application, an application in chemical analysis, an application for controlling color of cosmetics and textiles, an office automation application, an application for controlling backlight in a cellular telephone, an application for controlling backlight in a portable computer display, an application for controlling backlight in a personal digital assistant display, an application for controlling backlight in a computer monitor, and an application for controlling backlight in a television display.

8. The color sensing circuit of claim 1 wherein the color sensing circuit includes a first output to generate a first color signal representing a first color channel, a second output to generate a second color signal representing a second color channel and a third output to generate a third color signal representing a third color channel.

9. The color sensing circuit of claim 1 further comprising:

a reset circuit coupled to the first node to selectively reset the voltage at the first node to a first predetermined voltage based on a reset control signal; wherein the signal processing circuit selectively asserts the reset control signal.

10. The color sensing circuit of claim 9 wherein the reset circuit includes a current source to generate a bias current; wherein the current source includes a first electrode coupled to the first predetermined voltage and a second electrode coupled to the first node; and a reset transistor having a first electrode coupled to the first predetermined voltage, a second electrode coupled to the second electrode of the current source and a third node for receiving the reset control signal; wherein the reset transistor selectively resets the voltage at the first node to the first predetermined voltage when the reset control signal is asserted.

11. A color sensing circuit for one of identifying a color, measuring a color, and color control comprising:

a) a light source to generate light;

b) a light detector to receive reflected light and to generate a signal that is dependent on received light; wherein the light detector includes a first electrode coupled to a first node and a second electrode coupled to a second predetermined signal;

c) a storage device that includes a first electrode and a second electrode coupled to the second predetermined signal;

d) a first switch to selectively couple the first node with the first electrode of the storage device based on a charge control signal;

e) a signal processing circuit that includes a first electrode and an output to generate a signal that represents the light received by the light detector; and f) a second switch to selectively couple the first electrode of the storage device with the first electrode of the signal processing circuit based on an evaluate control signal; wherein the signal processing circuit selectively asserts the charge control signal and evaluate control signal.

12. The color sensing circuit of claim 11 wherein the charge storage device is implemented with a capacitor.

13. The color sensing circuit of claim 11 wherein the first switch further comprises:

a transistor that includes a first electrode coupled to the second node of a current source, a second electrode coupled to the first node of the charge storage device, and a third electrode for receiving the charge control signal; wherein the first electrode and the second electrode form a current path and wherein current flows through the current path when the charge control signal is asserted.

14. The color sensing circuit of claim 13 wherein the second switch further comprises:

a transistor that includes a first electrode coupled to the first node of the charge storage device, a second electrode coupled to the first node of the signal processing circuit, and a third electrode for receiving the evaluate control signal; wherein the first electrode and the second electrode form a current path, and wherein current flows through the current path when the evaluate control signal is asserted.

15. The color sensing circuit of claim 11 wherein the light detector includes a photodiode to receive the light and generates a photodiode current corresponding to the received light and a color filter to allow only light of a predetermined wavelength to pass there through.

16. The color sensing circuit of claim 11 wherein the signal processing circuit includes a state machine that includes a charge state and an evaluate state; wherein the charge control signal is asserted during the charge state, the evaluate control signal is asserted during the evaluate state, and the reset signal is asserted during the evaluate state.

17. The color sensing circuit of claim 11 wherein the color sensing circuit is implemented in one of a color detection application, color measurement application, a color control application, an application for controlling interior lighting, an application for controlling backlight, an imaging application, a medical/life science application, a camera application, an application in chemical analysis, an application for controlling color of cosmetics and textiles, an office automation application, an application for controlling backlight in a cellular telephone, an application for controlling backlight in a portable computer display, an application for controlling backlight in a personal digital assistant display, an application for controlling backlight in a computer monitor, and an application for controlling backlight in a television display.

18. The color sensing circuit of claim 11 wherein the color sensing circuit includes a first output to generate a first color signal representing a first color channel, a second output to generate a second color signal representing a second color channel and a third output to generate a third color signal representing a third color channel.

19. The color sensing circuit of claim 11 further comprising:
  a reset circuit coupled to the first node to selectively reset the voltage at the first node to a first predetermined voltage based on a reset control signal; wherein the signal processing circuit selectively asserts the reset control signal.

20. The color sensing circuit of claim 19 wherein the reset circuit includes
  a current source to generate a bias current that includes a first electrode coupled to the first predetermined voltage and a second electrode coupled to the first node; and a reset transistor having a first electrode coupled to the first predetermined voltage, a second electrode coupled to the second electrode of the current source and a third node for receiving the reset control signal; wherein the reset transistor selectively resets the voltage at the first node to the first predetermined voltage when the reset control signal is asserted.

* * * * *

UNITED STATES PATENT AND TRADEMARK OFFICE
CERTIFICATE OF CORRECTION

PATENT NO. : 7,491,927 B2                                        Page 1 of 1
APPLICATION NO. : 10/877864
DATED           : February 17, 2009
INVENTOR(S)     : Tan et al.

It is certified that error appears in the above-identified patent and that said Letters Patent is hereby corrected as shown below:

Column 7, Line 19, Claim 3, delete "to the" and insert --to a--.

Column 7, Line 20, Claim 3, delete "of the" and insert --of a--.

Column 7, Line 47, Claim 6, delete "and the" and insert --and a--.

Column 8, Line 50, Claim 13, delete "to the" and insert --to a--.

Column 9, Line 10 (approx.), Claim 16, delete "and the" and insert --and a--.

Signed and Sealed this

Twenty-first Day of December, 2010

David J. Kappos
*Director of the United States Patent and Trademark Office*